United States Patent
Beppu et al.

(10) Patent No.: US 8,133,836 B2
(45) Date of Patent: Mar. 13, 2012

(54) CERIA-ZIRCONIA SOLID SOLUTION CRYSTAL FINE PARTICLES AND THEIR PRODUCTION PROCESS

(75) Inventors: Yoshihisa Beppu, Tokyo (JP); Kazuo Sunahara, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/796,492

(22) Filed: Jun. 8, 2010

(65) Prior Publication Data

US 2010/0298127 A1 Nov. 25, 2010

Related U.S. Application Data

(63) Continuation of application No. PCT/JP2007/073806, filed on Dec. 10, 2007.

(51) Int. Cl.
  *B01J 21/02* (2006.01)
  *B01J 23/10* (2006.01)
(52) U.S. Cl. ......... 502/202; 502/302; 502/303; 502/304
(58) Field of Classification Search .................. 502/202, 502/302, 303, 304
  See application file for complete search history.

(56) References Cited

U.S. PATENT DOCUMENTS

| 5,607,892 | A | 3/1997 | Chopin et al. |
| 7,381,232 | B2 * | 6/2008 | Beppu et al. ............ 51/309 |
| 7,871,956 | B2 * | 1/2011 | Wakita et al. ............ 502/304 |
| 2007/0204519 | A1 | 9/2007 | Beppu et al. |
| 2009/0113809 | A1 * | 5/2009 | Sakai et al. |
| 2010/0022387 | A1 | 1/2010 | Beppu et al. |
| 2010/0159246 | A1 | 6/2010 | Sakai et al. |

FOREIGN PATENT DOCUMENTS

| EP | 1 818 312 A1 | 8/2007 |
| JP | 4-55315 | 2/1992 |
| JP | 5186217 A | 7/1993 |
| JP | 6154606 A | 6/1994 |
| JP | 6279027 A | 10/1994 |
| JP | 8-333116 | 12/1996 |
| JP | 3341973 | 11/2002 |
| JP | 2003277059 A | 10/2003 |
| JP | 2004-331492 | 11/2004 |
| JP | 2005170774 A | 6/2005 |
| JP | 2005247585 A | 9/2005 |
| WO | WO2006/030763 | 3/2006 |
| WO | WO2006/049197 | 5/2006 |

OTHER PUBLICATIONS

Extended European Search Report issued Feb. 7, 2011, in Patent Application No. 07850372.9.
Akihiro Suda, et al. "Nanoparticle for Practical Use" Powder Nanotechnology, Journal of the Society of Powder Technology, vol. 41, No. 3, (pp. 218-223) 2004.
Kenichi Kawamura, et al. "Electrical Conductivities of CaO doped $ZrO_2$-$CeO_2$ Solid Solution System" Solid State Ionics, vol. 144, (pp. 11-18) 2001. www.elsevier.com/locate/ssi.
Office Action issued on Jan. 11, 2011 in the corresponding Japanese Patent Application No. 2006-158666 (with English Translation).

* cited by examiner

*Primary Examiner* — Elizabeth Wood
(74) *Attorney, Agent, or Firm* — Oblon, Spivak, McClelland, Maier & Neustadt, L.L.P.

(57) ABSTRACT

To provide a process for producing ceria-zirconia solid solution crystal fine particles having high crystallinity, being excellent in uniformity of composition and particle size, having a small particle size and a high specific surface area and being excellent in heat resistance, and such solid solution crystal fine particles.

A process comprises a step of obtaining a melt containing, as represented by mol % based on oxides, from 5 to 50% of ($ZrO_2$+$CeO_2$), from 10 to 60% of RO (wherein R is at least one member selected from the group consisting of Mg, Ca, Sr and Ba) and from 25 to 70% of $B_2O_3$, a step of quenching the melt to obtain an amorphous material, a step of heating the amorphous material at a temperature of from 550 to 1000° C. to precipitate a ceria-zirconia solid solution crystal in the amorphous material, and a step of separating components other than the ceria-zirconia solid solution crystal from the obtained precipitates to obtain the ceria-zirconia solid solution crystal fine particles, in this order.

12 Claims, 5 Drawing Sheets

CERIA-ZIRCONIA SOLID SOLUTION CRYSTAL FINE PARTICLES AND THEIR PRODUCTION PROCESS

TECHNICAL FIELD

The present invention relates to ceria-zirconia solid solution crystal fine particles and their production process, and it relates to a process for producing ceria-zirconia solid solution crystal fine particles which are easily produced and are excellent in uniformity of composition and particle size, and particularly preferably, have high crystallinity, and such fine particles.

BACKGROUND ART

Heretofore, it has been known to use, as a co-catalyst of a three-way catalyst for treatment of exhaust gas discharged from automobiles, oxides based on $CeO_2$ (hereinafter, also referred to as "ceria") excellent in performance on discharge and storage of oxygen. Here, the three-way catalyst is a catalyst having a function to remove carbon monoxide, hydrocarbons and nitrogen oxide from the exhaust gas generated with combustion of an internal combustion engine, by oxidizing or reducing them to carbon dioxide, water and nitrogen, respectively. Further, it has also been known to use a ceria catalyst as a catalyst for removing particulate matter (particulates) in the exhaust gas by oxidizing them to carbon dioxide and water.

If catalysts having such properties are developed, it is possible to reduce the amount of rare metals (such as Pt, Rh and Pd) as a rare resource which have been used as a catalyst material, whereby resource saving can be expected.

A solid solution (see e.g. Patent Document 1) having a rare-earth element such as lanthanum or zirconium solid-solved in ceria, and a solid solution (see e.g. Non-Patent Document 1) having cerium solid-solved in $ZrO_2$ (hereinafter, also referred to as zirconia), are recently proposed as one of the ceria catalysts showing such properties.

As a process for producing such a solid solution, usually, a solution method such as an impregnation method or a coprecipitation method is employed. With reference to preparation of a solid solution having zirconium solid-solved in ceria as an example, the impregnation method is carried out in such a manner that a ceria powder is immersed in a solution containing zirconium, and the resulting immersed powder is subjected to heat treatment to obtain an oxide (see e.g. Patent Document 1). On the other hand, the coprecipitation method is carried out in such a manner that a solution containing cerium and zirconium is prepared, precipitates (coprecipitates) containing cerium and zirconium is obtained e.g. by controlling the pH of the solution, and then the coprecipitates are subjected to heat treatment to obtain an oxide (see e.g. Patent Document 2).

In the impregnation method, the particle size of a solid solution to be produced is likely to be controlled by the particle size of a raw material, and is likely to be affected particularly by the particle size of ceria particles as a raw material. Accordingly, in a case where the particle size of the raw material is large or non-uniform, it is impossible to obtain fine particulate particles having uniform particle size and chemical composition. On the other hand, in the coprecipitation method, it is difficult to obtain coprecipitates containing cerium and zirconium in a desired composition because constituent elements of the raw materials precipitate at respective different pHs. Therefore, for sufficient progress of solid solution formation, complicated operations are essential in selection of additives, control of reaction conditions, and so on.

Further, in either method, a heat treatment is essential and a resulting product will undergo grain growth by heat, and therefore it is not easy to obtain a ceria-zirconia solid solution in the form of fine particulates (e.g., fine particles with an average primary particle size of at most 200 nm). In addition, the crystallinity of fine particles to be obtained is also low.

In order to solve the problems, Patent Document 3 proposes a process for producing a ceria-zirconia solid solution by pulverizing a ceria powder and a zirconium compound in the presence of pulverization media, under conditions of friction of pulverization media with one another and/or pulverization media and a member of a pulverization apparatus. It is possible to obtain a fine particulate ceria-zirconia solid solution by such a method, but since an operation to let zirconia contained in the pulverization media and/or the member of the pulverization apparatus be solid-solved in ceria is essential, reaction tends to take time, such being problematic.

Patent Document 1: JP-A-4-55315 (Claims)
Patent Document 2: Japanese Patent No. 3341973 (Claims)
Patent Document 3: JP-A-8-333116 (Claims)
Non-Patent Document 1: Journal of the Society of Powder Technology (Vol. 41, No. 3, 218-223, 2004)

DISCLOSURE OF THE INVENTION

Objects to be Accomplished by the Invention

In view of recent tendencies toward higher performance and high-temperature use of catalysts, as mentioned above, there is a demand to develop a ceria-zirconia solid solution catalyst which has a high specific surface area and high heat resistance, and of which the specific surface area will not be decreased even at high temperatures.

Particularly, it is known that a ceria-zirconia solid solution having a cubic crystal structure has a stable crystal structure, and therefore oxygen readily transfers, and therefore such a solid solution is superior in discharge and storage of oxygen to a ceria-zirconia solid solution having a tetragonal or monoclinic crystal structure (e.g. Patent Document 2). Accordingly, it is also desired to develop a process for selectively producing a cubic crystal ceria-zirconia solid solution.

Accordingly, the present invention relates to a process for producing ceria-zirconia solid solution crystal fine particles, and it is an object of the present invention to provide a process for readily producing ceria-zirconia solid solution crystal fine particles having a small particle size and excellent uniformity in the particle size, having cerium and zirconium solid-solved in a desired composition, and being highly crystalline, and to provide such ceria-zirconia solid solution crystal fine particles.

Means to Accomplish the Objects

The present invention provides the following.

(1) A process for producing ceria-zirconia solid solution crystal fine particles, comprising a step of obtaining a melt containing, as represented by mol % based on oxides, from 5 to 50% of ($ZrO_2$+$CeO_2$), from 10 to 60% of RO (wherein R is at least one member selected from the group consisting of Mg, Ca, Sr and Ba) and from 25 to 70% of $B_2O_3$, a step of quenching the melt to obtain an amorphous material, a step of heating the amorphous material at a temperature of from 550 to 1000° C. to precipitate ceria-zirconia solid solution crystals in the amorphous material, and a step of separating components other than the ceria-zirconia solid solution crystals from the obtained precipitates to obtain the ceria-zirconia solid solution crystal fine particles, in this order.

(2) The process for producing ceria-zirconia solid solution crystal fine particles according to the above (1), wherein in the chemical composition of the melt, $ZrO_2/(ZrO_2+CeO_2)=3$ to 97%, as represented by mol % based on oxides.

(3) The process for producing ceria-zirconia solid solution crystal fine particles according to the above (1) or (2), wherein in the chemical composition of the melt, $RO/(RO+B_2O_3)=10$ to 70% (wherein R is at least one member selected from the group consisting of Mg, Ca, Sr and Ba), as represented by mol % based on oxides.

(4) The process for producing ceria-zirconia solid solution crystal fine particles according to any one of the above (1) to (3), wherein in the chemical composition of the melt, Ca is contained as R.

(5) The process for producing ceria-zirconia solid solution crystal fine particles according to any one of the above (1) to (4), wherein in the chemical composition of the melt, R is Ca.

(6) The process for producing ceria-zirconia solid solution crystal fine particles according to any one of the above (1) to (5), wherein the amorphous material is of a flake form or a fiber form.

(7) The process for producing ceria-zirconia solid solution crystal fine particles according to any one of the above (1) to (6), wherein the step of separating the components other than the ceria-zirconia solid solution crystal is carried out by using an acid.

(8) The process for producing ceria-zirconia solid solution crystal fine particles according to any one of the above (1) to (7), wherein the ceria-zirconia solid solution crystals have a cubic crystal structure.

(9) The process for producing ceria-zirconia solid solution crystal fine particles according to any one of the above (1) to (8), wherein in the chemical composition of the ceria-zirconia solid solution crystal fine particles, $ZrO_2/(ZrO_2+CeO_2)=1$ to 99%, as represented by mol % based on oxides.

(10) The process for producing ceria-zirconia solid solution crystal fine particles according to any one of Claims 1 to 9, wherein in the chemical composition of the ceria-zirconia solid solution crystal fine particles, $RO/(CeO_2+ZrO_2+RO+B_2O_3)=0.01$ to 20%, as represented by mol % based on oxides.

(11) The process for producing ceria-zirconia solid solution crystal fine particles according to any one of the above (1) to (10), wherein the ceria-zirconia solid solution crystal fine particles have an average primary particle size of from 5 to 200 nm.

(12) The process for producing ceria-zirconia solid solution crystal fine particles according to any one of the above (1) to (11), wherein the ceria-zirconia solid solution crystal fine particles have a specific surface area of at least 20 $m^2/g$.

(13) Ceria-zirconia solid solution crystal fine particles comprising, as represented by mol % based on oxides, from 70 to 99.9% of $(ZrO_2+CeO_2)$, from 0.01 to 20% of RO (wherein R is at least one member selected from the group consisting of Mg, Ca, Sr and Ba) and from 0.01 to 10% of $B_2O_3$.

(14) The ceria-zirconia solid solution crystal fine particles according to the above (13), wherein in the chemical composition of the ceria-zirconia solid solution crystal fine particles, $ZrO_2/(ZrO_2+CeO_2)=1$ to 99%, as represented by mol % based on oxides.

(15) The ceria-zirconia solid solution crystal fine particles according to the above (13) or (14), wherein in the chemical composition of the ceria-zirconia solid solution crystal fine particles, Ca is contained as R.

(16) The ceria-zirconia solid solution crystal fine particles according to any one of the above (13) to (15), wherein in the chemical composition of the ceria-zirconia solid solution crystal fine particles, R is Ca.

(17) The ceria-zirconia solid solution crystal fine particles according to any one of the above (13) to (16), which have a cubic crystal structure.

(18) The ceria-zirconia solid solution crystal fine particles according to any one of the above (13) to (17), which have an average primary particle size of from 5 to 200 nm.

(19) The ceria-zirconia solid solution crystal fine particles according to any one of the above (13) to (18), which have a specific surface area of at least 20 $m^2/g$.

Effects of the Invention

According to the present invention, it is feasible to readily produce solid solution crystal fine particles having a small particle size, having zirconium and cerium solid-solved in the desired composition, and being highly crystalline.

The fine particles have a small particle size and a high specific surface area. Furthermore, they also have excellent heat resistance and undergo insignificant change in the particle size and the specific surface area even in high-temperature use. Therefore, the fine particles can be used over a long period of time as an oxidation-reduction catalyst, as a material for a co-catalyst of a three-way catalyst for treatment of exhaust gas discharged from automobiles, as a material for fuel cells and as a polishing material.

BEST MODE FOR CARRYING OUT THE INVENTION

Figure 1:
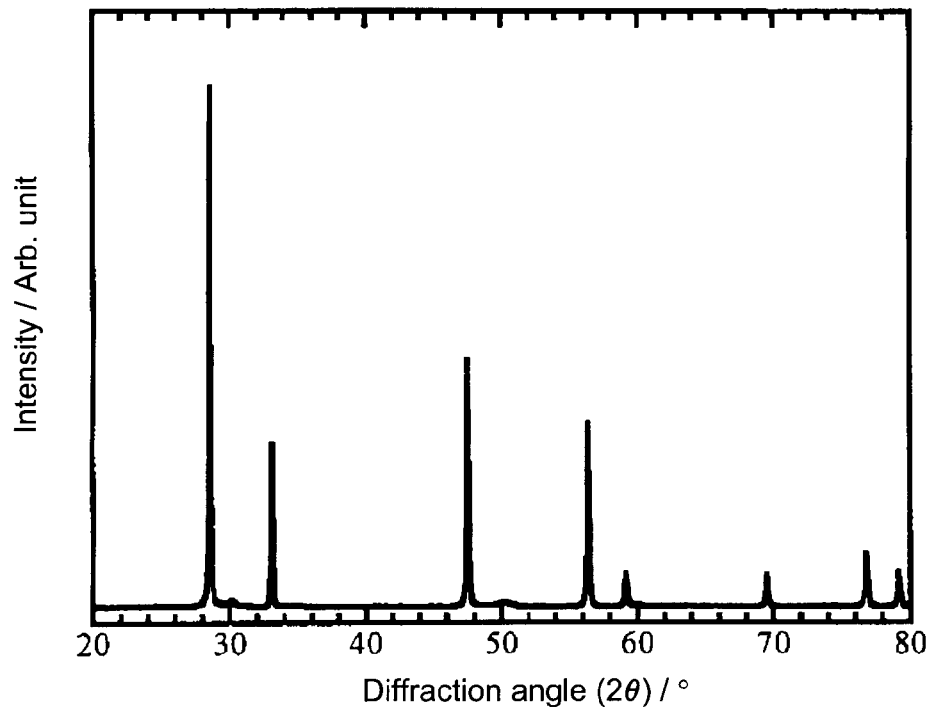
FIG. 1 illustrates an X-ray diffraction pattern of ceria-zirconia solid solution crystal fine particles obtained in Example 8.

The production process of the present invention comprises a step of obtaining a melt in a predetermined composition (hereinafter referred to as "melting step"), a step of quenching the melt to obtain an amorphous material (hereinafter referred to as "quenching step"), a step of heating the amorphous material to obtain precipitates containing ceria-zirconia solid solution crystals in the amorphous material (hereinafter referred to as "crystallizing step"), and a step of separating components other than the ceria-zirconia solid solution crystals from the resulting precipitates to obtain the ceria-zirconia solid solution crystal fine particles (hereinafter referred to as "separating step") in this order.

[Melting Step]

The melting step is to obtain a melt comprising, as represented by mol % based on oxides, from 5 to 50% of ($ZrO_2$+$CeO_2$), from 10 to 60% of RO (wherein R is at least one member selected from the group consisting of Mg, Ca, Sr and Ba) and from 25 to 70% of $B_2O_3$.

The melt in the above composition range is preferred because it has a moderate viscosity and undergoes vitrification without crystallization of the melt to provide an amorphous material in the subsequent quenching step.

If the content of ($ZrO_2$+$CeO_2$) in the melt exceeds 50%, if the content of RO is less than 10%, or if the content of $B_2O_3$ is less than 25%, the melting tends to be insufficient or the melt is likely to crystallize in the quenching step, whereby it is difficult to obtain the amorphous material by vitrification. As a result, it is difficult to obtain ceria-zirconia solid solution crystal fine particles in a desired composition, such being undesirable.

On the other hand, if the content of ($ZrO_2$+$CeO_2$) in the melt is less than 5%, if RO exceeds 60%, or if $B_2O_3$ exceeds 70%, the ceria-zirconia solid solution crystal fine particles might not sufficiently precipitate in the subsequent crystallizing step, such being undesirable.

It is noted that mol % based on oxides means, unless otherwise specified, a mole percentage based on a molecule in which an oxide of the metal is maximum, and is calculated from a charged amount of a raw material. That is, an amount of each element (Zr, Ce, R, or B) derived from each raw material is calculated from a charged amount of the raw material; the amount of each element is converted to an amount of an oxide thereof ($ZrO_2$, $CeO_2$, RO or $B_2O_3$) with the maximum oxidation number of the element; and a ratio (mol %) of each oxide to the total amount is calculated, thereby obtaining mol % based on oxides.

Particularly, when the content of ($ZrO_2$+$CeO_2$) in the melt is from 15 to 35%, the content of RO is from 15 to 60%, and the content of $B_2O_3$ is from 30 to 60%, it is easy to obtain the ceria-zirconia solid solution crystal fine particles in a desired composition, and further a yield thereof can be increased, such being favorable.

Further, when the contents of $ZrO_2$, $CeO_2$, RO and $B_2O_3$ in the melt are respectively from 5 to 20%, from 5 to 30%, from 15 to 60% and from 30 to 60%, a melt having a moderate viscosity can easily be obtained, and fine particles having a small particle size are likely to be obtained. Further, there are also advantages that ceria-zirconia solid solution crystal fine particles having a desired composition are likely to be obtained, and further the yield of the obtained ceria-zirconia solid solution crystal fine particles is high relative to the raw materials of the melt.

Further, when the content of $ZrO_2$ in the melt is within a range of from 3 to 97 mol % based on the total amount of $ZrO_2$ and $CeO_2$, ceria-zirconia solid solution crystal fine particles having a desired composition are likely to be obtained, such being favorable, and the content is more preferably from 20 to 80 mol %.

In addition, when the content of RO in the melt is within a range of from 10 to 70 mol % based on the total amount of RO and $B_2O_3$, the melt is readily vitrified and further the ceria-zirconia solid solution crystal fine particles can readily be obtained, such being favorable, and the content is more preferably from 20 to 65 mol %.

The melt can be obtained by using, as raw materials, a compound as a Zr source, a compound as a Ce source, a compound as an R source and a compound as a B source, mixing these raw materials at a predetermined ratio so that a resulting melt has a composition within the above composition range, and heating the mixture in the presence of oxygen.

The composition of this mixture theoretically corresponds, in principle, to the composition of the melt obtained from this mixture. However, the mixture contains components easily lost e.g. by volatilization during the melting treatment, such as B, and the composition of the resulting melt might be slightly different from the composition as represented by mol % based on oxides calculated from charged amounts of the respective raw materials.

First of all, the Zr source is preferably at least one member selected from the group consisting of zirconium oxide ($ZrO_2$), zirconium hydroxide ($Zr(OH)_4$) and ceria, magnesia and calcia-stabilized zirconia (($Ce,Ca,Mg)_xZr_{1-x}O_2$ where $0<x\leq0.2$). In addition, it may also be at least one member selected from the group consisting of zirconium chloride ($ZrCl_4.nH_2O$), zirconium nitrate ($Zr(NO_3)_4.nH_2O$), zirconium sulfate ($Zr(SO_4)_2.nH_2O$) and zirconium fluoride ($ZrF_4$). (In the above formulae, n is a hydration number and a case of n=0, i.e., an anhydride is also included. Furthermore, their respective oxysalts are also included.)

Further, the Ce source is preferably at least one member selected from the group consisting of cerium oxides ($CeO_2$, $Ce_2O_3$) and cerium carbonate ($Ce_2(CO_3)_3.nH_2O$). In addition, it may also be at last one member selected from the group consisting of cerium chloride ($CeCl_3.nH_2O$), cerium nitrate ($Ce(NO_3)_3.nH_2O$), cerium sulfate ($Ce_2(SO_4)_3.nH_2O$), ammonium cerium(IV) nitrate ($Ce(NH_4)_2(NO_3)_6$) and cerium fluoride ($CeF_3$). (In the above formulae, n is a hydration number, and a case of n=0, i.e., an anhydride is also included. Furthermore, their respective oxysalts are also included.)

Further, the R source is preferably at least one member selected from the group consisting of an oxide of R(RO) and a carbonate of R($RCO_3$). In addition, it may also be at least one member selected from the group consisting of a nitrate of R($R(NO_3)_2$), a chloride of R($RCl_2.nH_2O$), a sulfate of R($RSO_4$) and a fluoride of R($RF_2$). (In the above formulae, n is a hydration number, and a case n=0, i.e., an anhydride is also included. Furthermore, their respective oxysalts are also included.) For the purpose of reducing the melting temperature and facilitating vitrification in the quenching step described below, a part of RO may be substituted by ZnO.

Among them, when R is Ba or Sr, vitrification of ceria and zirconia in the quenching step will be easy, such being preferred.

Further, when Ca is contained as R, more preferably when R is Ca, it is particularly preferred since the resulting ceria-zirconia solid solution crystals tend to have a crystal structure of a single cubic crystal. The reason is not necessarily clear, but is estimated that the lattice constant (0.5411 nm) of the cubic crystal ceria and the lattice constant (for example, 0.5225 nm) of the cubic crystal calcium-stabilized zirconia are close, and therefore it becomes easy to maintain a cubic crystal structure.

Further, as the B source, boron oxide ($B_2O_3$) or boric acid ($H_3BO_3$) is preferably used, but a borate of R may also be used.

The purity of materials in the mixture is not particularly limited within a range not to degrade desired properties, but the purity excluding the water of hydration is preferably at least 99%, more preferably at least 99.9%. Further, the particle size of the above materials is not particularly limited within a range where a uniform melt is obtained by melting. Further, the materials are preferably dryly or wetly mixed by means of a mixing/grinding means such as a ball mill or a planetary mill and then melted.

Melting may be carried out in the air atmosphere but is preferably carried out while controlling the oxygen partial pressure and the oxygen flow rate. Further, a crucible used for melting is preferably made of alumina, platinum or platinum containing rhodium, but may be made of a refractory material in some cases. The melting is carried out preferably by using a resistant heating furnace, a high frequency induction furnace or a plasma-arc furnace. The resistance heating furnace is preferably an electric furnace provided with a heating element made of a metal such as a nichrome alloy, or made of silicon carbide, molybdenum silicide or lanthanum chromite. The high frequency induction furnace is one provided with an induction coil and capable of controlling the output. Further, the plasma-arc furnace is one employing carbon or the like as an electrode, and utilizing the plasma-arc generated by the electrode. Further, the mixture may be melted by directly heating by infrared rays or laser.

The above mixture may be melted in a powder state, or it may be molded and then melted. In the case of using a plasma-arc furnace, it is possible to mold the mixture, melt the molded mixture as it is and then quench the melt.

Melting of the mixture is carried out at 1,200° C. or above, preferably from 1,300 to 1,600° C., and the obtained glass melt may be stirred to increase uniformity.

[Quenching Step]

In the quenching step, the melt obtained as above is rapidly cooled to around room temperature to obtain the amorphous material. Here, a cooling rate is preferably at least $100°$ C./sec, more preferably at least $1\times10^{4°}$ C./sec. Further, usually, the cooling rate is preferably at most $1\times10^{10°}$ C./sec.

In the quenching step, a method preferably applied is a method of dropping the melt between twin rollers rotating at a high speed, to obtain the amorphous material in the flake form, or a method of continuously taking up the amorphous material in the fiber form (long fiber) from the melt with use of a drum rotating at a high speed. Here, the twin rollers and drum are preferably those made of metal or ceramics. In addition, the amorphous material may be obtained in the fiber form (short fiber) by use of a spinner having pores in a side wall and rotating at a high speed. By using one of these apparatus, the melt is effectively quenched to obtain the amorphous material with a high purity.

In a case where the amorphous material is of the flake form, the melt is preferably quenched so that an average thickness of the amorphous material becomes at most 200 μm, more preferably at most 100 μm. Furthermore, in a case where the amorphous material is of the fiber form, the quenching step is preferably conducted so that an average diameter is at most 50 μm, more preferably at most 30 μm. By adjusting the average thickness or the average diameter to at most the above upper limit, a crystallization efficiency can be increased in the subsequent crystallizing step. Further, usually, both of the average thickness and average diameter are preferably at least 1 μm.

If the amorphous material is obtained with the thickness or diameter exceeding the above upper limit, the amorphous material is preferably subjected to pulverization and then supplied to the subsequent crystallizing step.

Here, the average thickness in the case of the flake form can be measured with a vernier calipers or a micrometer. The average diameter in the case of the fiber form can be measured by the foregoing method or by observation with a microscope.

[Crystallizing Step]

In the crystallizing step, the amorphous material obtained in the quenching step is heated to obtain precipitates containing ceria-zirconia solid solution crystals.

The heating temperature in the crystallizing step is from 550 to 1,000° C. If the crystallization temperature is less than 550° C., crystals are unlikely to precipitate even by continuous heating for about 24 hours. On the other hand, the crystallization temperature exceeding 1,000° C. is undesirable because the crystallized material containing the amorphous material might be melted. The crystallization temperature is more preferably from 650 to 850° C.

A crystal-precipitating process consists of two steps of nucleation and crystal growth subsequent thereto, and thus the two steps can be conducted at different temperatures.

Further, in the range of from 550 to 1,000° C., as the crystallization temperature is raised, a production amount and particle sizes of the precipitated crystals tend to become higher, and therefore, the crystallization temperature may be determined in accordance with the desired particle size.

Furthermore, by changing the crystallization temperature in the range of from 550 to 1,000° C., the $ZrO_2/(ZrO_2+CeO_2)$ ratio of finally obtainable ceria-zirconia solid solution crystal fine particles is also influenced, and therefore it is preferred to set the crystallization temperature by also taking it into consideration.

Further, in the crystallization, the above temperature range is preferably retained for from 1 to 120 hours because the ceria-zirconia solid solution can be sufficiently crystallized. On that occasion, as the retention time is set longer, a production amount of the precipitated crystals is increased and the particle sizes of the precipitated crystals tend to become larger; therefore, the retention time is determined in accordance with the desired amount and particle sizes of the precipitated crystals. Further, the above $ZrO_2/(ZrO_2+CeO_2)$ ratio is also influenced by changing such a retention time, and therefore it is preferred to set the retention time by also taking it into consideration.

Further, in the present invention, ceria-zirconia solid solution crystal fine particles precipitate as crystals by crystallization of the amorphous material. Depending upon the composition of the raw material mixture, a borate of R, or double salts of $ZrO_2$, $CeO_2$, RO and boric acid might precipitate in some cases. In the case of removing the double salts, they can be removed by adjusting the separation conditions in the subsequent separating step.

[Separating Step]

In the separating step, components other than the above ceria-zirconia solid solution crystals are separated from the precipitates obtained in the crystallizing step, to obtain fine particles of the above ceria-zirconia solid solution crystals.

The separating step preferably includes a step of adding an acid into the crystal precipitated particles. Substances other than the ceria-zirconia solid solution crystals can be readily leached and removed by the addition of the acid into the crystal precipitated particles.

The acid to be used can be an inorganic acid such as acetic acid, hydrochloric acid or nitric acid, or an organic acid such as oxalic acid or citric acid. At this point, in order to promote the leaching treatment and to adjust the particle sizes of the fine particles within a desired range, the precipitates including the ceria-zirconia solid solution crystals may be dryly or wetly pulverized before the leaching treatment. When the pulverization is conducted, it is preferred to use a medium such as a ball mill. Further, in order to promote the reaction, the acid may be used as heated, and ultrasonic irradiation may be used in combination. Although some of the ceria-zirconia solid solution crystals are dissolved by this leaching treatment in some cases, it is rather preferred from the viewpoint of uniformizing the particle size. Further, the leaching treatment may be repeated multiple times.

After the leaching treatment, washing with pure water is carried out as the case requires, to obtain ceria-zirconia solid solution crystal fine particles.

[Characteristics of Solid Solution Crystal Fine Particles]

The ceria-zirconia solid solution crystal fine particles obtained by the present invention are preferably solid solution crystal fine particles which comprise ceria as a main component and in which zirconia is solid-solved in the ceria or solid solution crystal fine particles which comprise zirconia as a main component and in which ceria is solid-solved in the zirconia, in view of high catalytic activity, excellent heat resistance and a high specific surface area.

It is noted that the term "main component" herein means that the content of the aforementioned oxide (ceria or zirconia) is the largest to the total of $ZrO_2$, $CeO_2$, RO and $B_2O_3$ in the chemical composition of the ceria-zirconia fine particles.

In the chemical composition of the ceria-zirconia solid solution crystal fine particles of the present invention, it is preferred that a small amount of RO and $B_2O_3$ are further solid-solved. First, since a small amount of RO is solid-solved, it is possible to improve corrosion resistance of a catalyst in a case where the solid solution crystal fine particles are used for e.g. a three way catalyst. Further, since a small amount of RO is solid-solved, the ceria-zirconia solid solution crystals are likely to have a cubic crystals structure, and it is thereby possible to form fine particles more excellent in performance on discharge and storage of oxygen than the ceria-zirconia solid solution crystals having a tetragonal or monoclinic crystal structure. Further, small amounts of $B_2O_3$ is solid-solved, whereby it is possible to compensate an electric charge of R which is solid-solved in a small amount as mentioned above, and as a result, the crystal structure will be stabilized, such being preferred. Specifically, the chemical composition of the ceria-zirconia solid solution crystal fine particles preferably comprises from 70 to 99.9% of ($ZrO_2$+$CeO_2$), from 0.01 to 20% of RO (wherein R is at least one member selected from the group consisting of Mg, Ca, Sr and Ba) and from 0.01 to 10% of $B_2O_3$, as represented by mol % based on oxides. Among them, it is preferred that Ca is contained as R, and it is particularly preferred that R is Ca.

Further, the term "small amounts of RO and $B_2O_3$ are solid-solved" means that the contents of RO and $B_2O_3$ are respectively at least 0.01%, as represented by mol % based on oxides, to the total of $ZrO_2$, $CeO_2$, RO and $B_2O_3$ in the chemical composition of the solid solution crystal fine particles.

At that time, in the chemical composition of the solid solution crystal fine particles, the content of RO is at most 20%, and the content of $B_2O_3$ is at most 10%, as represented by mol % based on oxides, to the total of $ZrO_2$, $CeO_2$, RO and $B_2O_3$, whereby it is possible to sufficiently develop catalyst characteristics of the ceria-zirconia solid solution crystals, such being preferred. More preferred contents of RO and $B_2O_3$ are respectively from 0.1 to 20% and from 0.02 to 5%.

Further, if $ZrO_2/(ZrO_2+CeO_2)$=1 to 99 mol % in the chemical composition of the ceria-zirconia solid solution crystal fine particles, fine particles having high catalytic activity and excellent heat resistance can be formed. Further, it is more preferably from 20 to 80 mol %, since the catalytic activity can further be increased.

Further, the ceria-zirconia solid solution crystals are particularly preferably one having a cubic crystal structure, since they are more excellent in performance on discharge and storage of oxygen than ceria-zirconia solid solution crystals having a tetragonal or monoclinic crystal structure.

Further, when RO/($CeO_2$+$ZrO_2$+RO+$B_2O_3$)=0.01 to 20 mol % in the chemical composition of the ceria-zirconia solid solution crystal fine particles, the ceria-zirconia solid solution crystals are likely to have a cubic crystal structure, such being favorable.

It is preferred that Ca is contained as R, since the ceria-zirconia solid solution crystals are likely to have a cubic crystal structure. Further, it is particularly preferred that R is Ca since the ceria-zirconia solid solution crystals are likely to have a cubic crystal structure singly.

Further, the smaller the average primary particle size (the major axis in the case of anisotropic particles) of the ceria-zirconia solid solution crystal fine particles, the larger the specific surface area can be made, whereby the catalytic activity can be increased. Particularly, the average primary particle size is preferably from 5 to 200 nm, since fine particles having excellent heat resistance and a high specific surface area can be formed, and the average primary particle size is more preferably from 5 to 100 nm. Further, in the present invention, the average primary particle size is the crystalline size, and is a particle size calculated based on the Scherrer's formula from the X-ray diffraction line broadening.

Further, the specific surface area of the ceria-zirconia solid solution crystal fine particles is preferably at least 20 m²/g, since it is possible to increase the catalytic activity. More preferred specific surface area of the fine particles is at least 30 m²/g. Further, the preferred specific surface area of the fine particles is at most 300 m²/g.

Further, the specific surface area of the fine particles after the ceria-zirconia solid solution crystal fine particles obtained in the present invention are heated at 800° C. for 12 hours, is preferably at least 10 m²/g, since it is possible to obtain fine particles having excellent heat resistance and a high specific surface area.

EXAMPLES

Now, the present invention will be described in detail with reference to Examples. However, it should be understood that the present invention is by no means thereby restricted. Examples 1o to 116 are Examples of the present invention, and Examples 117 to 120 are Comparative Examples.

Examples 1 to 16

Zirconium oxide ($ZrO_2$), cerium oxide ($CeO_2$), $RCO_3$ (R is at least one member selected from the group consisting of Ba, Sr, Ca and Mg) and boron oxide ($B_2O_3$) were respectively weighed so that a melt had a composition shown in Table 1 as represented by mol % based on oxides ($ZrO_2$, $CeO_2$, RO and $B_2O_3$), and they were dryly mixed and pulverized to obtain a raw material mixture.

TABLE 1

| | Chemical composition of melt [mol %] | | | | $ZrO_2/$ $(ZrO_2 + CeO_2)$ [mol %] | $(ZrO_2 + CeO_2)/$ $(ZrO_2 + CeO_2 +$ $RO + B_2O_3)$ [mol %] | $RO/$ $(RO + B_2O_3)$ [mol %] | Crystalline size [nm] |
|---|---|---|---|---|---|---|---|---|
| | $ZrO_2$ | $CeO_2$ | RO | $B_2O_3$ | | | | |
| Ex. 1 | 1.0 | 19.0 | 13.3SrO + 13.3BaO | 53.3 | 5.0 | 20.0 | 33.3 | 38 |
| Ex. 2 | 2.0 | 18.0 | 13.3SrO + 13.3BaO | 53.3 | 10.0 | 20.0 | 33.3 | 34 |
| Ex. 3 | 4.0 | 16.0 | 13.3SrO + 13.3BaO | 53.3 | 20.0 | 20.0 | 33.3 | 21 |
| Ex. 4 | 6.0 | 14.0 | 13.3SrO + 13.3BaO | 53.3 | 30.0 | 20.0 | 33.3 | 20 |
| Ex. 5 | 8.0 | 12.0 | 13.3SrO + 13.3BaO | 53.3 | 40.0 | 20.0 | 33.3 | 27 |
| Ex. 6 | 10.0 | 10.0 | 26.7BaO | 53.3 | 50.0 | 20.0 | 33.3 | 22 |
| Ex. 7 | 10.0 | 10.0 | 26.7SrO | 53.3 | 50.0 | 20.0 | 33.3 | 21 |
| Ex. 8 | 10.0 | 10.0 | 13.3SrO + 13.3BaO | 53.3 | 50.0 | 20.0 | 33.3 | 15 |
| Ex. 9 | 12.0 | 8.0 | 13.3SrO + 13.3BaO | 53.3 | 60.0 | 20.0 | 33.3 | 20 |
| Ex. 10 | 16.0 | 4.0 | 13.3SrO + 13.3BaO | 53.3 | 80.0 | 20.0 | 33.3 | 30 |
| Ex. 11 | 18.0 | 2.0 | 13.3SrO + 13.3BaO | 53.3 | 90.0 | 20.0 | 33.3 | 32 |
| Ex. 12 | 12.5 | 12.5 | 12.5SrO + 12.5BaO | 50.0 | 50.0 | 25.0 | 33.3 | 25 |
| Ex. 13 | 16.7 | 16.7 | 6.7SrO + 6.7BaO | 53.3 | 50.0 | 33.4 | 20.0 | 37 |
| Ex. 14 | 5.0 | 5.0 | 22.5SrO + 22.5BaO | 45.0 | 50.0 | 10.0 | 50.0 | 20 |
| Ex. 15 | 5.0 | 15.0 | 20.0MgO | 60.0 | 25.0 | 20.0 | 25.0 | 24 |
| Ex. 16 | 5.0 | 15.0 | 20.0CaO | 60.0 | 25.0 | 20.0 | 25.0 | 25 |

The raw material mixture obtained was put in a crucible with a nozzle, made of platinum containing 20 mass % of rhodium, and heated in an electric furnace with a heating element made of molybdenum silicide at 1,500° C. in the air for one hour to be completely melted.

Then, the glass melt was dropped while heating the bottom end of the nozzle by the electric furnace, and droplets were made to pass between twin rollers with a diameter of about 15 cm rotating at 300 rpm so that the droplets were quenched at about $1 \times 10^5$° C./sec to obtain a solid material in the flake form. The flakes thus obtained showed a brownish-red color and were a transparent amorphous material. Thicknesses of the flakes were measured with a micrometer and found to be from 30 to 50 μm.

The glass transition temperature and the crystallization temperature were preliminarily obtained by differential scanning calorimetry (DSC) using some of the flakes obtained. The flakes were heated at 820° C. which was higher than all the crystallization onset temperatures of the flakes, for 8 hours to precipitate ceria-zirconia solid solution crystals.

Then, the flakes after the crystallization treatment were shaken and stirred in a 1 mol/L acetic acid solution at 70° C. for at least 6 hours to leach soluble materials. A liquid after leaching was subjected to centrifugal separation, and a supernatant was discarded. After this operation was repeated five times, washing with water was carried out five times, followed by drying to obtain fine particles having a particle size of from 5 to 200 nm.

The mineral phase of the fine particles thus obtained was identified by means of an X-ray diffractometer. As a result, all diffraction peaks of the fine particles of Examples 1 to 16 agreed approximately with at least one diffraction peak of existing $ZrO_2$ (JCPDS card No. 37-1484), $Zr_{0.5}Ce_{0.5}O_2$ (JCPDS card No. 38-1436), $Zr_{0.84}Ce_{0.16}O_2$ (JCPDS card No. 38-1437) and $CeO_2$ (JCPDS card No. 34-0394). Further, the diffraction peaks of the fine particles in Examples 1 to 16 confirmed herein were mainly those attributable to the main components of the fine particles.

The X-ray diffraction pattern (Cu-Kα ray was used, the same also applies hereinafter) of the ceria-zirconia solid solution crystal fine particles obtained in Example 8 is shown in FIG. 1.

Then, an average primary particle size was obtained. It is noted that the average primary particle size herein is the crystalline size, and is a particle size calculated based on the Scherrer's formula from the X-ray diffraction line broadening. The results are shown in Table 1. It is clear from Table 1 that all the fine particles obtained had very small particle sizes.

Further, a liquid mixture of $HF-HNO_3-H_2O_2$ was added to some of the ceria-zirconia solid solution crystal fine particles obtained in Examples 3, 8 and 10 to decompose them into a solution and contents of Zr and Ce were measured with an ICP emission spectrometer. Based on them, $ZrO_2/(ZrO_2+CeO_2)$ [mol %] in the chemical composition of the fine particles was determined, and it was 12%, 58% and 85% in Examples 3, 8 and 10, respectively.

Then, a BET specific surface area of the ceria-zirconia solid solution crystal fine particles obtained in Examples 8 and 14 was obtained by a nitrogen multiple-point adsorption method, and as a result, it was 106 m²/g and 84 m²/g, respectively, and the fine particles had high specific surface areas.

Further, the ceria-zirconia solid solution crystal fine particles obtained in Examples 8 and 14 were heated in an electric furnace at 800° C. for 12 hours under the air atmosphere and then cooled to room temperature, then the BET specific surface area was determined in the same manner as the above, and as a result, such high specific surface areas of 15 m²/g and 13 m²/g, respectively, were maintained.

Examples 17 to 55

Zirconium oxide ($ZrO_2$), cerium oxide ($CeO_2$), $CaCO_3$ and boron oxide ($B_2O_3$) were respectively weighed so that a melt had a composition shown in Table 2 as represented by mol % based on $ZrO_2$, $CeO_2$, RO and $B_2O_3$, and they were dryly mixed and pulverized to obtain a raw material mixture.

TABLE 2

| | Chemical composition of melt [mol %] | | | | $ZrO_2/$ $(ZrO_2 + CeO_2)$ [mol %] | $(ZrO_2 + CeO_2)/$ $(ZrO_2 + CeO_2 +$ $RO + B_2O_3)$ [mol %] | $RO/$ $(RO + B_2O_3)$ [mol %] |
|---|---|---|---|---|---|---|---|
| | $ZrO_2$ | $CeO_2$ | RO | $B_2O_3$ | | | |
| Ex. 17 | 6.0 | 4.0 | 56.3CaO | 33.8 | 60.0 | 10.0 | 62.5 |
| Ex. 18 | 9.0 | 6.0 | 53.1CaO | 31.9 | 60.0 | 15.0 | 62.5 |
| Ex. 19 | 9.0 | 6.0 | 47.2CaO | 37.8 | 60.0 | 15.0 | 55.6 |
| Ex. 20 | 12.0 | 8.0 | 44.4CaO | 35.6 | 60.0 | 20.0 | 55.6 |
| Ex. 21 | 9.0 | 6.0 | 42.5CaO | 42.5 | 60.0 | 15.0 | 50.0 |
| Ex. 22 | 12.0 | 8.0 | 40.0CaO | 40.0 | 60.0 | 20.0 | 50.0 |
| Ex. 23 | 9.0 | 6.0 | 37.8CaO | 47.2 | 60.0 | 15.0 | 44.4 |
| Ex. 24 | 12.0 | 8.0 | 35.6CaO | 44.4 | 60.0 | 20.0 | 44.5 |
| Ex. 25 | 18.0 | 12.0 | 31.1CaO | 38.9 | 60.0 | 30.0 | 44.4 |
| Ex. 26 | 12.0 | 8.0 | 32.0CaO | 48.0 | 60.0 | 20.0 | 40.0 |
| Ex. 27 | 15.0 | 10.0 | 30.0CaO | 45.0 | 60.0 | 25.0 | 40.0 |
| Ex. 28 | 12.0 | 8.0 | 26.7CaO | 53.3 | 60.0 | 20.0 | 33.3 |
| Ex. 29 | 15.0 | 10.0 | 25.0CaO | 50.0 | 60.0 | 25.0 | 33.3 |
| Ex. 30 | 18.0 | 12.0 | 23.3CaO | 46.7 | 60.0 | 30.0 | 33.3 |
| Ex. 31 | 21.0 | 14.0 | 21.7CaO | 43.3 | 60.0 | 35.0 | 33.3 |
| Ex. 32 | 15.0 | 10.0 | 15.0CaO | 60.0 | 60.0 | 25.0 | 20.0 |
| Ex. 33 | 18.0 | 12.0 | 14.0CaO | 56.0 | 60.0 | 30.0 | 20.0 |
| Ex. 34 | 4.0 | 6.0 | 56.3CaO | 33.8 | 40.0 | 10.0 | 62.5 |
| Ex. 35 | 6.0 | 9.0 | 53.1CaO | 31.9 | 40.0 | 15.0 | 62.5 |
| Ex. 36 | 6.0 | 9.0 | 47.2CaO | 37.8 | 40.0 | 15.0 | 55.6 |
| Ex. 37 | 8.0 | 12.0 | 44.4CaO | 35.6 | 40.0 | 20.0 | 55.6 |
| Ex. 38 | 10.0 | 15.0 | 41.7CaO | 33.3 | 40.0 | 25.0 | 55.6 |
| Ex. 39 | 6.0 | 9.0 | 42.5CaO | 42.5 | 40.0 | 15.0 | 50.0 |
| Ex. 40 | 8.0 | 12.0 | 40.0CaO | 40.0 | 40.0 | 20.0 | 50.0 |
| Ex. 41 | 10.0 | 15.0 | 37.5CaO | 37.5 | 40.0 | 25.0 | 50.0 |
| Ex. 42 | 12.0 | 18.0 | 35.0CaO | 35.0 | 40.0 | 30.0 | 50.0 |
| Ex. 43 | 8.0 | 12.0 | 35.6CaO | 44.4 | 40.0 | 20.0 | 44.5 |
| Ex. 44 | 12.0 | 18.0 | 31.1CaO | 38.9 | 40.0 | 30.0 | 44.4 |
| Ex. 45 | 8.0 | 12.0 | 32.0CaO | 48.0 | 40.0 | 20.0 | 40.0 |
| Ex. 46 | 10.0 | 15.0 | 30.0CaO | 45.0 | 40.0 | 25.0 | 40.0 |
| Ex. 47 | 12.0 | 18.0 | 28.0CaO | 42.0 | 40.0 | 30.0 | 40.0 |
| Ex. 48 | 14.0 | 21.0 | 26.0CaO | 39.0 | 40.0 | 35.0 | 40.0 |
| Ex. 49 | 10.0 | 15.0 | 25.0CaO | 50.0 | 40.0 | 25.0 | 33.3 |
| Ex. 50 | 12.0 | 18.0 | 23.3CaO | 46.7 | 40.0 | 30.0 | 33.3 |
| Ex. 51 | 14.0 | 21.0 | 21.7CaO | 43.3 | 40.0 | 35.0 | 33.3 |
| Ex. 52 | 10.0 | 15.0 | 15.0CaO | 60.0 | 40.0 | 25.0 | 20.0 |
| Ex. 53 | 12.0 | 18.0 | 14.0CaO | 56.0 | 40.0 | 30.0 | 20.0 |
| Ex. 54 | 14.0 | 21.0 | 13.0CaO | 52.0 | 40.0 | 35.0 | 20.0 |
| Ex. 55 | 16.0 | 24.0 | 12.0CaO | 48.0 | 40.0 | 40.0 | 20.0 |

The raw material mixture thus obtained was subjected to the mixing and pulverizing operation, melting operation, quenching operation, crystallizing operation and leaching operation in the same manner as in Examples 1 to 16 to obtain crystalline fine particles having a particle size of from 5 to 200 nm.

The mineral phase of the obtained fine particles was identified by means of an X-ray diffractometer. As a result, all the diffraction peaks of the fine particles of Examples 17 to 55 agreed approximately with at least one diffraction peak disclosed in Powder Diffraction File (hereinafter referred to as PDF#) of International Centre for Diffraction Data (ICDD), of existing cubic $ZrO_2$ (PDF#49-1642), cubic $CeO_2$ (PDF#34-0394), a solid solution of cubic $ZrO_2$ and cubic $CeO_2$, tetragonal $ZrO_2$ (PDF#72-1669) and $Zr_{0.5}Ce_{0.5}O_2$ (PDF#38-1436), or a diffraction peak of $Zr_{0.84}Ce_{0.16}O_2$ (PDF#38-1437) or $CeO_2$ (JCPDS card No. 34-0394).

Further, it was considered that the fine particles in Examples 17 to 20 comprised a solid solution of cubic $ZrO_2$ and cubic $CeO_2$ as a main component or a single phase of a solid solution of and cubic $ZrO_2$ and cubic $CeO_2$, from the diffraction peak patterns thereof.

Further, it was considered that the fine particles in Examples 32 and 33 comprised a solid solution of cubic $CeO_2$ and tetragonal $ZrO_2$ as a main component or a single phase of a solid solution of cubic $CeO_2$ and tetragonal $ZrO_2$, from the diffraction peak patterns thereof.

Examples 56 to 96

Zirconium oxide ($ZrO_2$), cerium oxide ($CeO_2$), $RCO_3$ (R is at least one member selected from the group consisting of Ba, Sr and Ca) and boron oxide ($B_2O_3$) were respectively weighed so that a melt had a composition shown in Table 3 as represented by mol % based on $ZrO_2$, $CeO_2$, RO and $B_2O_3$, and they were dryly mixed and pulverized to obtain a raw material mixture.

TABLE 3

| | Chemical composition of melt [mol %] | | | | $ZrO_2/$ $(ZrO_2 + CeO_2)$ [mol %] | $(ZrO_2 + CeO_2)/$ $(ZrO_2 + CeO_2 +$ $RO + B_2O_3)$ [mol %] | $RO/$ $(RO + B_2O_3)$ [mol %] |
|---|---|---|---|---|---|---|---|
| | $ZrO_2$ | $CeO_2$ | RO | $B_2O_3$ | | | |
| Ex. 56 | 2.0 | 18.0 | 44.4CaO | 35.6 | 10.0 | 20.0 | 55.5 |
| Ex. 57 | 4.0 | 16.0 | 44.4CaO | 35.6 | 20.0 | 20.0 | 55.5 |

TABLE 3-continued

| | Chemical composition of melt [mol %] | | | | ZrO$_2$/ (ZrO$_2$ + CeO$_2$) [mol %] | (ZrO$_2$ + CeO$_2$)/ (ZrO$_2$ + CeO$_2$ + RO + B$_2$O$_3$) [mol %] | RO/ (RO + B$_2$O$_3$) [mol %] |
|---|---|---|---|---|---|---|---|
| | ZrO$_2$ | CeO$_2$ | RO | B$_2$O$_3$ | | | |
| Ex. 58 | 6.0 | 14.0 | 44.4CaO | 35.6 | 30.0 | 20.0 | 55.6 |
| Ex. 59 | 7.0 | 13.0 | 44.4CaO | 35.6 | 35.0 | 20.0 | 55.6 |
| Ex. 60 | 8.0 | 12.0 | 44.4CaO | 35.6 | 40.0 | 20.0 | 55.6 |
| Ex. 61 | 9.0 | 11.0 | 44.4CaO | 35.6 | 45.0 | 20.0 | 55.5 |
| Ex. 62 | 10.0 | 10.0 | 44.4CaO | 35.6 | 50.0 | 20.0 | 55.5 |
| Ex. 63 | 11.0 | 9.0 | 44.4CaO | 35.6 | 55.0 | 20.0 | 55.6 |
| Ex. 64 | 12.0 | 8.0 | 44.4CaO | 35.6 | 60.0 | 20.0 | 55.6 |
| Ex. 65 | 14.0 | 6.0 | 44.4CaO | 35.6 | 70.0 | 20.0 | 55.6 |
| Ex. 66 | 16.0 | 4.0 | 44.4CaO | 35.6 | 80.0 | 20.0 | 55.5 |
| Ex. 67 | 2.5 | 22.5 | 37.5CaO | 37.5 | 10.0 | 25.0 | 50.0 |
| Ex. 68 | 5.0 | 20.0 | 37.5CaO | 37.5 | 20.0 | 25.0 | 50.0 |
| Ex. 69 | 7.5 | 17.5 | 37.5CaO | 37.5 | 30.0 | 25.0 | 50.0 |
| Ex. 70 | 10.0 | 15.0 | 37.5CaO | 37.5 | 40.0 | 25.0 | 50.0 |
| Ex. 71 | 12.5 | 12.5 | 37.5CaO | 37.5 | 50.0 | 25.0 | 50.0 |
| Ex. 72 | 15.0 | 10.0 | 37.5CaO | 37.5 | 60.0 | 25.0 | 50.0 |
| Ex. 73 | 17.5 | 7.5 | 37.5CaO | 37.5 | 70.0 | 25.0 | 50.0 |
| Ex. 74 | 20.0 | 5.0 | 37.5CaO | 37.5 | 80.0 | 25.0 | 50.0 |
| Ex. 75 | 2.5 | 22.5 | 33.3CaO | 41.7 | 10.0 | 25.0 | 44.4 |
| Ex. 76 | 5.0 | 20.0 | 33.3CaO | 41.7 | 20.0 | 25.0 | 44.4 |
| Ex. 77 | 7.5 | 17.5 | 33.3CaO | 41.7 | 30.0 | 25.0 | 44.4 |
| Ex. 78 | 10.0 | 15.0 | 33.3CaO | 41.7 | 40.0 | 25.0 | 44.4 |
| Ex. 79 | 12.5 | 12.5 | 33.3CaO | 41.7 | 50.0 | 25.0 | 44.4 |
| Ex. 80 | 15.0 | 10.0 | 33.3CaO | 41.7 | 60.0 | 25.0 | 44.4 |
| Ex. 81 | 17.5 | 7.5 | 33.3CaO | 41.7 | 70.0 | 25.0 | 44.4 |
| Ex. 82 | 20.0 | 5.0 | 33.3CaO | 41.7 | 80.0 | 25.0 | 44.4 |
| Ex. 83 | 5.0 | 15.0 | 26.7BaO | 53.3 | 25.0 | 20.0 | 33.4 |
| Ex. 84 | 5.0 | 15.0 | 26.7SrO | 53.3 | 25.0 | 20.0 | 33.4 |
| Ex. 85 | 1.0 | 19.0 | 13.3SrO + 13.3BaO | 53.3 | 5.0 | 20.0 | 33.3 |
| Ex. 86 | 2.0 | 18.0 | 13.3SrO + 13.3BaO | 53.3 | 10.0 | 20.0 | 33.3 |
| Ex. 87 | 3.0 | 17.0 | 13.3SrO + 13.3BaO | 53.3 | 15.0 | 20.0 | 33.3 |
| Ex. 88 | 4.0 | 16.0 | 13.3SrO + 13.3BaO | 53.3 | 20.0 | 20.0 | 33.3 |
| Ex. 89 | 5.0 | 15.0 | 13.3SrO + 13.3BaO | 53.3 | 25.0 | 20.0 | 33.3 |
| Ex. 90 | 6.0 | 14.0 | 13.3SrO + 13.3BaO | 53.3 | 30.0 | 20.0 | 33.3 |
| Ex. 91 | 8.0 | 12.0 | 13.3SrO + 13.3BaO | 53.3 | 40.0 | 20.0 | 33.3 |
| Ex. 92 | 10.0 | 10.0 | 13.3SrO + 13.3BaO | 53.3 | 50.0 | 20.0 | 33.3 |
| Ex. 93 | 12.0 | 8.0 | 13.3SrO + 13.3BaO | 53.3 | 60.0 | 20.0 | 33.3 |
| Ex. 94 | 14.0 | 6.0 | 13.3SrO + 13.3BaO | 53.3 | 70.0 | 20.0 | 33.3 |
| Ex. 95 | 16.0 | 4.0 | 13.3SrO + 13.3BaO | 53.3 | 80.0 | 20.0 | 33.3 |
| Ex. 96 | 18.0 | 2.0 | 13.3SrO + 13.3BaO | 53.3 | 90.0 | 20.0 | 33.3 |

The raw material mixture thus obtained was subjected to the mixing and pulverizing operation, melting operation, quenching operation, crystallizing operation and leaching operation in the same manner as in Examples 1 to 55 to obtain crystalline fine particles having a particle size of from 5 to 200 nm.

The mineral phase of the obtained fine particles was identified by means of an X-ray diffractometer. As a result, all the diffraction peaks of the fine particles of Examples 56 to 96 agreed approximately with at least one diffraction peak of existing cubic ZrO$_2$ (PDF#49-1642), cubic CeO$_2$ (PDF#34-0394), a solid solution of cubic ZrO$_2$ and cubic CeO$_2$, tetragonal ZrO$_2$ (PDF#72-1669) and Zr$_{0.5}$Ce$_{0.5}$O$_2$ (PDF#38-1436), or a diffraction peak of Zr$_{0.84}$Ce$_{0.16}$O$_2$ (PDF#38-1437) or CeO$_2$ (JCPDS card No. 34-0394). Further, it was considered that the fine particles in Examples 56 to 96 comprised a solid solution of cubic ZrO$_2$ and cubic CeO$_2$ as a main component or a single phase of a solid solution of cubic ZrO$_2$ and cubic CeO$_2$, from the diffraction peak patterns thereof.

Figure 2:
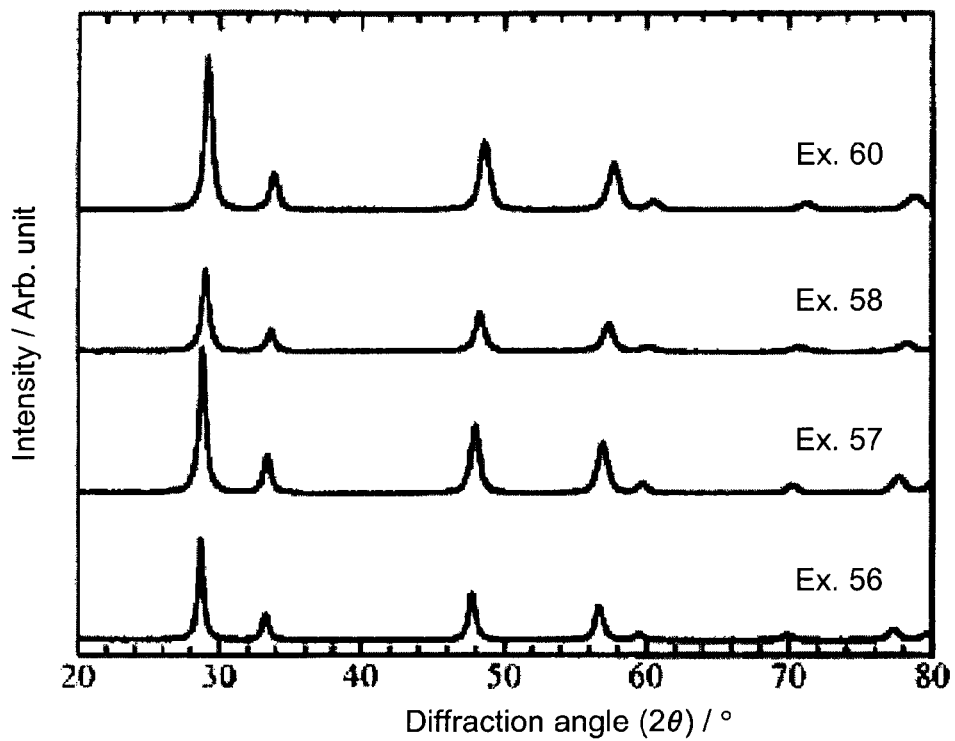
FIG. 2 illustrates X-ray diffraction patterns of ceria-zirconia solid solution crystal fine particles obtained in Examples 56 to 58 and 60.
Figure 3:
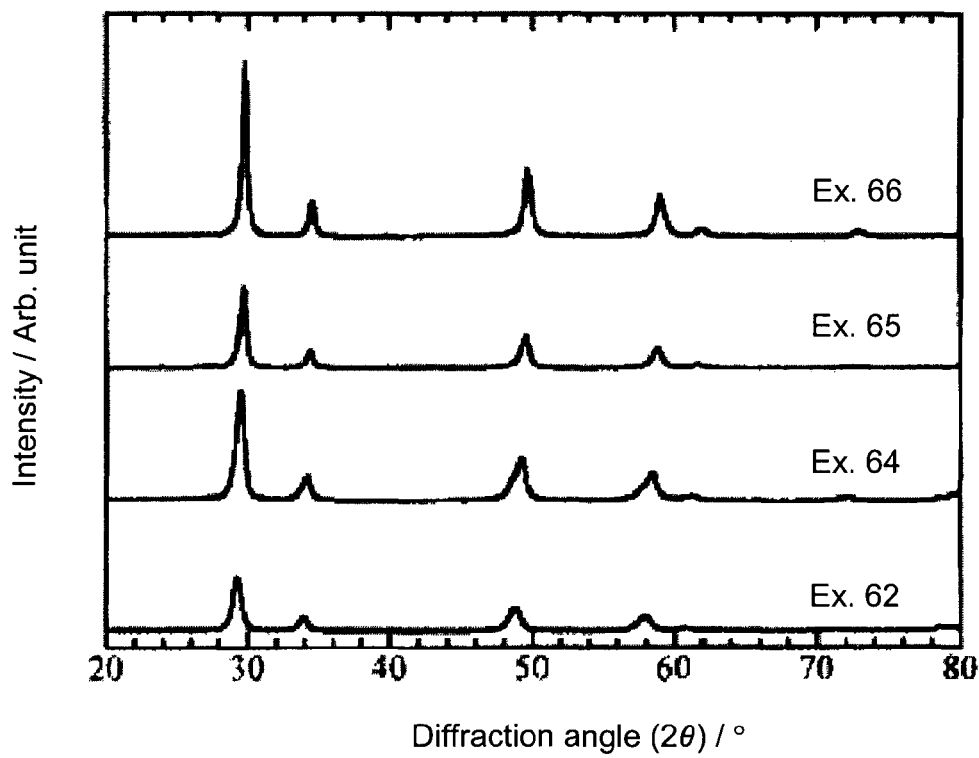
FIG. 3 illustrates X-ray diffraction patterns of ceria-zirconia solid solution crystal fine particles obtained in Examples 62 and 64 to 66.
Figure 4:
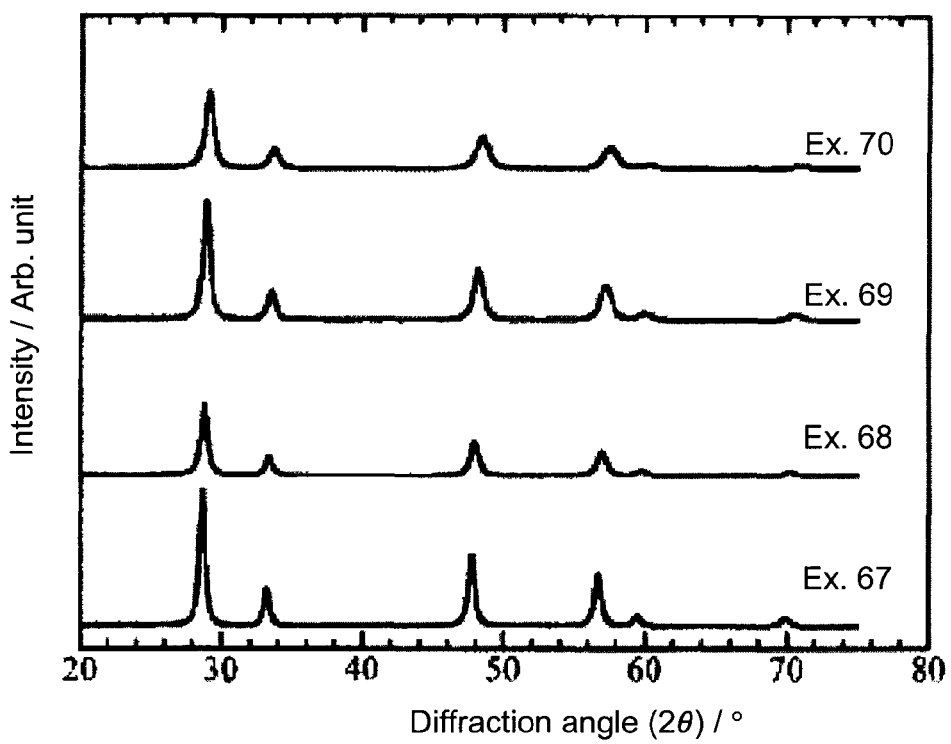
FIG. 4 illustrates X-ray diffraction patterns of ceria-zirconia solid solution crystal fine particles obtained in Examples 67 to 70.
Figure 5:
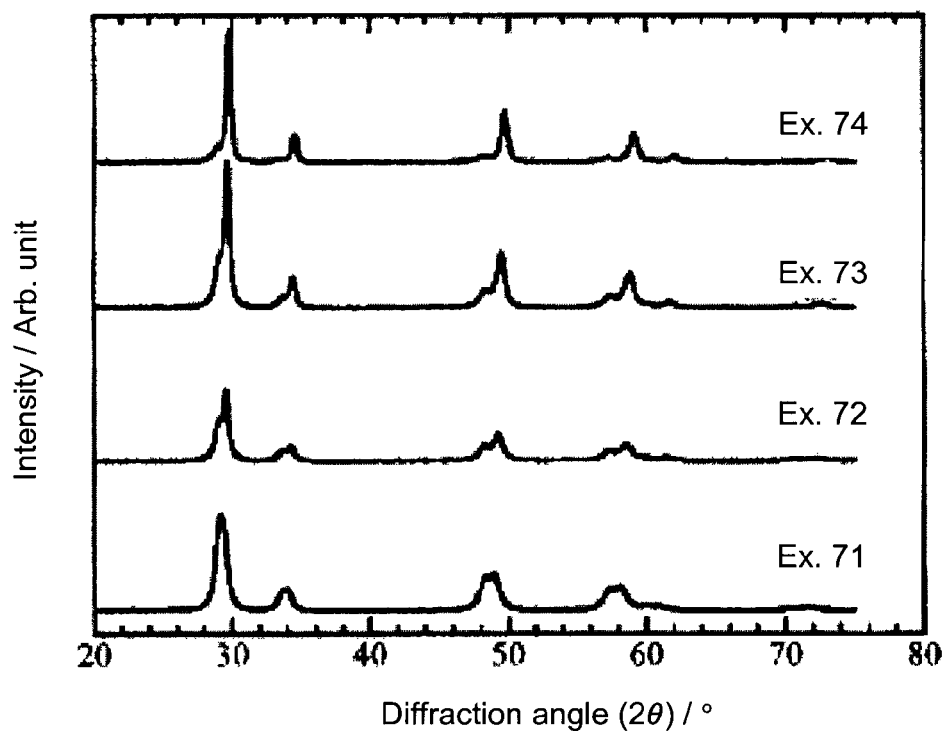
FIG. 5 illustrates X-ray diffraction patterns of ceria-zirconia solid solution crystal fine particles obtained in Examples 71 to 74.
Figure 6:
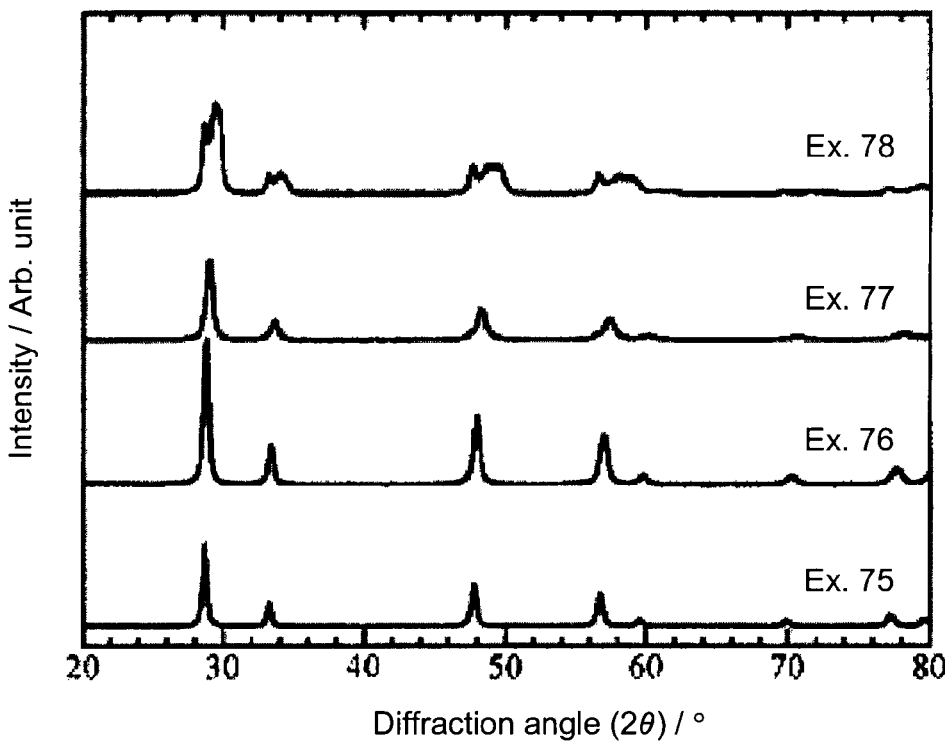
FIG. 6 illustrates X-ray diffraction patterns of ceria-zirconia solid solution crystal fine particles obtained in Examples 75 to 78.
Figure 7:
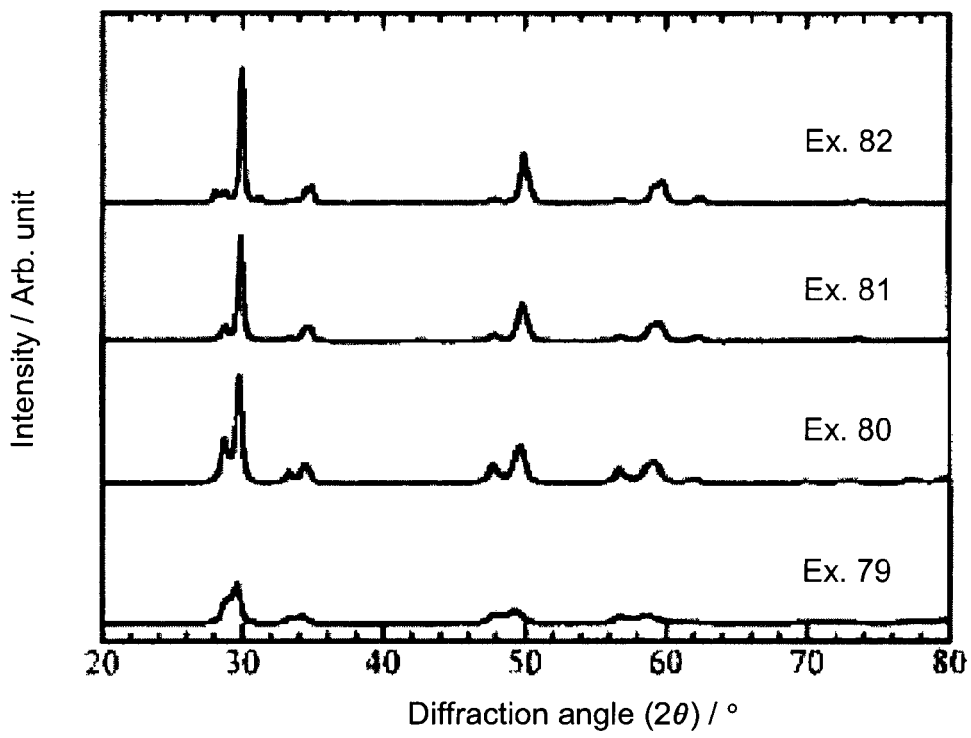
FIG. 7 illustrates X-ray diffraction patterns of ceria-zirconia solid solution crystal fine particles obtained in Examples 79 to 82.
Figure 8:
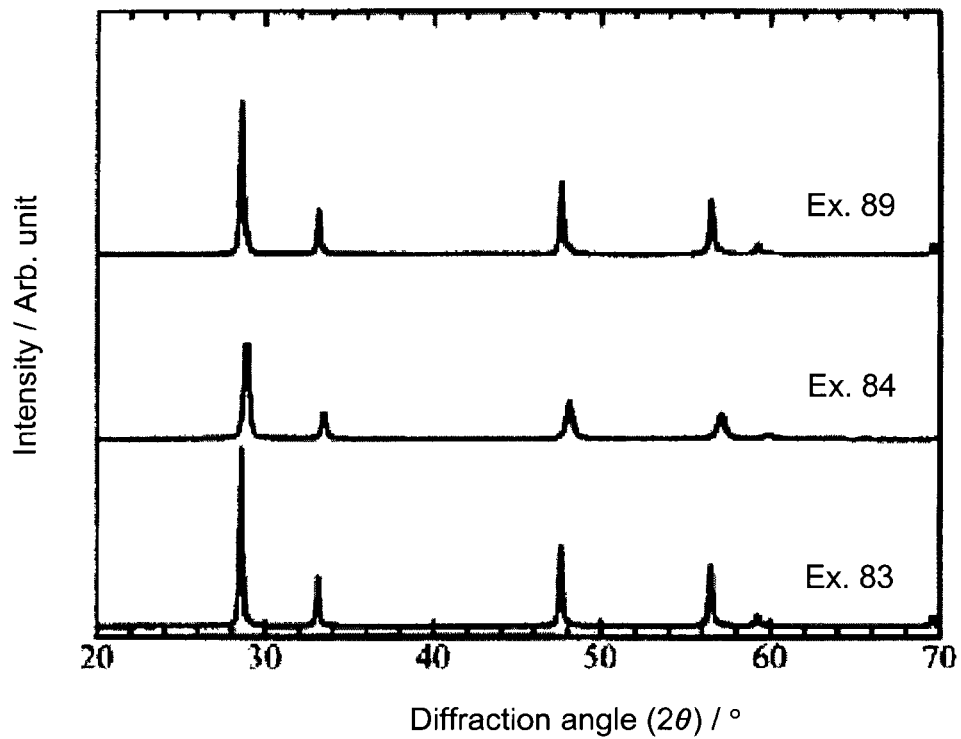
FIG. 8 illustrates X-ray diffraction patterns of ceria-zirconia solid solution crystal fine particles obtained in Examples 83, 84 and 89.

The X-ray diffraction patterns of the ceria-zirconia solid solution crystal fine particles obtained in Examples 56 to 58 and 60 are shown in FIG. 2, the X-ray diffraction patterns of the ceria-zirconia solid solution crystal fine particles obtained in Examples 62 and 64 to 66 are shown in FIG. 3, the X-ray diffraction patterns of the ceria-zirconia solid solution crystal fine particles obtained in Examples 67 to 70 are shown in FIG. 4, the X-ray diffraction patterns of the ceria-zirconia solid solution crystal fine particles obtained in Examples 71 to 74 are shown in FIG. 5, the X-ray diffraction patterns of the ceria-zirconia solid solution crystal fine particles obtained in Examples 75 to 78 are shown in FIG. 6, the X-ray diffraction patterns of the ceria-zirconia solid solution crystal fine particles obtained in Examples 79 to 82 are shown in FIG. 7, and the X-ray diffraction patterns of the ceria-zirconia solid solution crystal fine particles obtained in Examples 83, 84 and 89 are shown in FIG. 8, respectively.

Then, the chemical composition of each of the ceria-zirconia solid solution crystal fine particles obtained in Examples 56 to 58, 60, 62, 64 to 74 and 85 to 96 was determined as mentioned below.

ZrO$_2$ and CeO$_2$: Measurement was carried out by using a X-ray fluorescence analyzer.

RO(CaO, SrO and BaO) and B$_2$O$_3$: To some of the above obtained ceria-zirconia solid solution crystal fine particles, a liquid mixture of HF—HNO$_3$—H$_2$O$_2$ was added to decompose them into a solution, followed by measurement by using an ICP emission spectrometer.

Further, based on the above obtained measurement values, a ZrO$_2$/(ZrO$_2$+CeO$_2$) molar ratio and an RO/(ZrO$_2$+CeO$_2$+RO+B$_2$O$_3$) molar ratio were determined. These results are shown in Table 4.

TABLE 4

| | Chemical composition of solid solution crystal fine particles [mol %] | | | | | | $ZrO_2/$ $(ZrO_2 + CeO_2)$ [mol %] | $RO/$ $(ZrO_2 + CeO_2 + RO + B_2O_3)$ [mol %] |
|---|---|---|---|---|---|---|---|---|
| | $ZrO_2$ | $CeO_2$ | CaO | SrO | BaO | $B_2O_3$ | | |
| Ex. 56 | 11.9 | 83.3 | 3.8 | 0.0 | 0.0 | 1.0 | 12.5 | 4.0 |
| Ex. 57 | 19.5 | 74.8 | 4.6 | 0.0 | 0.0 | 1.1 | 20.7 | 4.9 |
| Ex. 58 | 29.4 | 64.2 | 5.3 | 0.0 | 0.0 | 1.1 | 31.4 | 5.6 |
| Ex. 60 | 39.4 | 53.5 | 6.1 | 0.0 | 0.0 | 1.1 | 42.4 | 6.5 |
| Ex. 62 | 46.6 | 45.8 | 6.6 | 0.0 | 0.0 | 1.0 | 50.4 | 7.1 |
| Ex. 64 | 56.2 | 35.8 | 7.1 | 0.0 | 0.0 | 1.0 | 61.1 | 7.6 |
| Ex. 65 | 65.4 | 25.0 | 8.3 | 0.0 | 0.0 | 1.3 | 72.3 | 9.0 |
| Ex. 66 | 70.4 | 18.4 | 9.5 | 0.0 | 0.0 | 1.7 | 79.3 | 10.5 |
| Ex. 67 | 11.9 | 84.0 | 3.2 | 0.0 | 0.0 | 0.9 | 12.4 | 3.3 |
| Ex. 68 | 20.0 | 76.0 | 3.0 | 0.0 | 0.0 | 0.9 | 20.8 | 3.1 |
| Ex. 69 | 30.2 | 66.1 | 2.9 | 0.0 | 0.0 | 0.8 | 31.4 | 2.9 |
| Ex. 70 | 39.3 | 56.4 | 3.5 | 0.0 | 0.0 | 0.8 | 41.1 | 3.6 |
| Ex. 71 | 46.3 | 47.9 | 4.7 | 0.0 | 0.0 | 1.0 | 49.2 | 5.0 |
| Ex. 72 | 53.1 | 38.1 | 7.0 | 0.0 | 0.0 | 1.8 | 58.2 | 7.5 |
| Ex. 73 | 58.2 | 30.3 | 9.1 | 0.0 | 0.0 | 2.4 | 65.8 | 10.0 |
| Ex. 74 | 66.6 | 19.5 | 11.4 | 0.0 | 0.0 | 2.4 | 77.4 | 12.9 |
| Ex. 85 | 91.1 | 7.3 | 0.0 | 0.5 | 0.1 | 1.0 | 92.6 | 0.6 |
| Ex. 86 | 86.8 | 11.3 | 0.0 | 0.6 | 0.1 | 1.2 | 88.5 | 0.8 |
| Ex. 87 | 80.2 | 18.2 | 0.0 | 0.6 | 0.2 | 0.9 | 81.5 | 0.8 |
| Ex. 88 | 65.1 | 32.7 | 0.0 | 0.7 | 0.2 | 1.4 | 66.6 | 0.8 |
| Ex. 89 | 56.7 | 41.5 | 0.0 | 0.7 | 0.2 | 1.0 | 57.7 | 0.8 |
| Ex. 90 | 49.8 | 48.6 | 0.0 | 0.5 | 0.1 | 0.9 | 50.6 | 0.6 |
| Ex. 91 | 31.7 | 67.0 | 0.0 | 0.4 | 0.1 | 0.7 | 32.1 | 0.5 |
| Ex. 92 | 23.5 | 75.7 | 0.0 | 0.2 | 0.1 | 0.5 | 23.7 | 0.3 |
| Ex. 93 | 16.4 | 82.9 | 0.0 | 0.2 | 0.1 | 0.4 | 16.5 | 0.2 |
| Ex. 94 | 10.0 | 88.6 | 0.0 | 0.1 | 0.2 | 1.1 | 10.1 | 0.3 |
| Ex. 95 | 9.1 | 90.3 | 0.0 | 0.0 | 0.0 | 0.5 | 9.2 | 0.1 |
| Ex. 96 | 2.5 | 97.0 | 0.0 | 0.0 | 0.0 | 0.4 | 2.6 | 0.1 |

Figure 9:
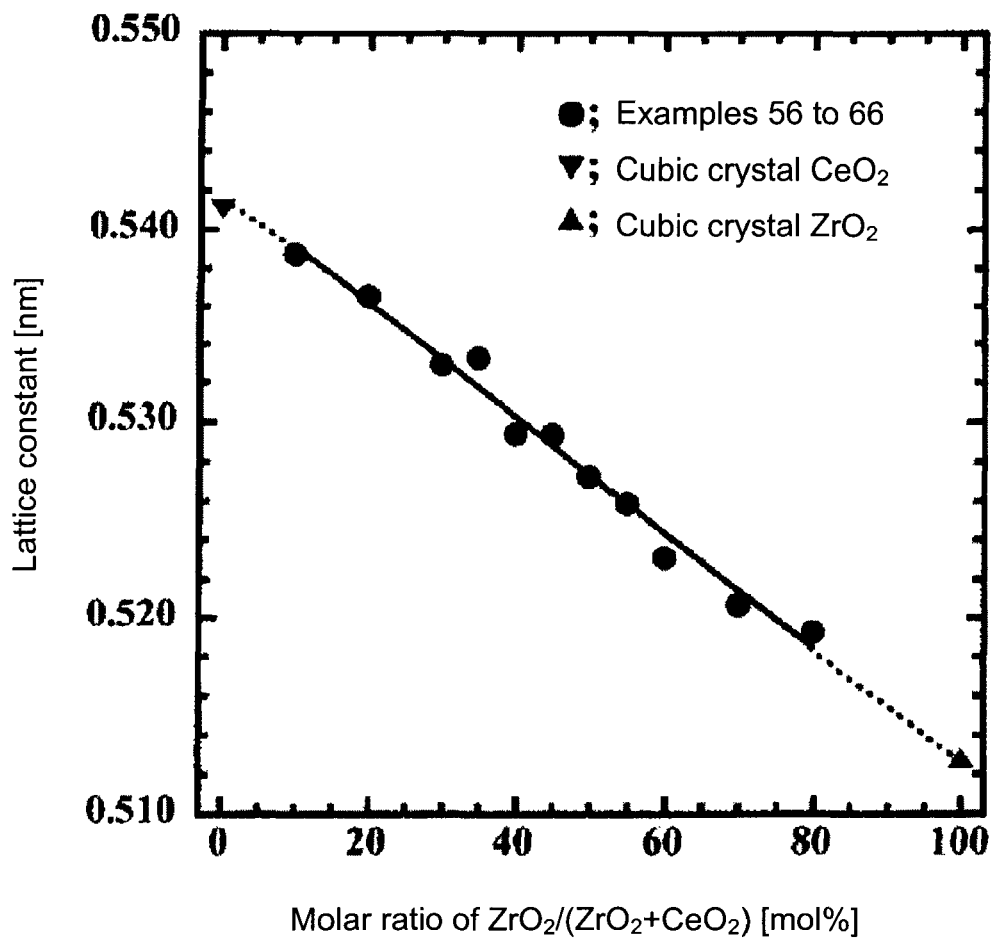
FIG. 9 illustrates a relation between lattice constants of cubic crystal ceria-zirconia solid solution crystal fine particles obtained in Examples 56 to 66 and $ZrO_2/(ZrO_2+CeO_2)$ molar ratios of melts.

Then, with regard to the solid solution crystal fine particles obtained in Examples 56 to 66, the lattice constant was determined from the diffraction angle on the (111) plane. The relation between the lattice constant and a molar ratio of $ZrO_2/(ZrO_2+CeO_2)$ in the chemical composition of the melt is shown in FIG. 9. Further, in FIG. 9, points corresponding to cubic $ZrO_2$ (lattice constant: 0.5128, PDF#49-1642, $ZrO_2/(ZrO_2+CeO_2)$ molar ratio=1) and cubic $CeO_2$ (lattice constant: 0.5411, PDF#34-0394, $ZrO_2/(ZrO_2+CeO_2)$ molar ratio=0) were respectively plotted for comparison. As shown in FIG. 9, the lattice constants of the solid solution crystal fine particles obtained in Examples 56 to 66 are distributed on a straight line connecting the point corresponding to cubic $ZrO_2$ and the point corresponding to cubic $CeO_2$. Thus, the solid solution crystal fine particles obtained in Examples 56 to 66 are considered to have a cubic crystal structure.

Further, the crystalline size of the ceria-zirconia solid solution crystal fine particles obtained in each of Examples 56 to 58, 60, 62 and 64 to 66 was obtained. The results are shown in Table 5. It is clear from Table 5 that all the fine particles obtained had very fine particle sizes.

Then, the BET specific surface area of the ceria-zirconia solid solution crystal fine particles obtained in each of Examples 56 to 58, 60, 62 and 64 to 66, was obtained by a nitrogen multiple-point adsorption method. The results are shown in Table 5. As is evident from Table 5, the obtained fine particles had high specific surface areas in each Example.

TABLE 5

| | Crystalline size [nm] | Specific surface area [m²/g] |
|---|---|---|
| Ex. 56 | 18.1 | 60.7 |
| Ex. 57 | 15.9 | 69.2 |
| Ex. 58 | 15.5 | 67.1 |
| Ex. 60 | 14.8 | 66.0 |
| Ex. 62 | 14.0 | 71.1 |
| Ex. 64 | 14.0 | 55.0 |
| Ex. 65 | 18.1 | 42.8 |
| Ex. 66 | 22.6 | 35.5 |

Examples 97 to 115

Zirconium oxide ($ZrO_2$), cerium oxide ($CeO_2$), $MgCO_3$ and boron oxide ($B_2O_3$) were weighed so that a melt had a composition shown in Table 6 represented by mol % based on $ZrO_2$, $CeO_2$, RO and $B_2O_3$, and they were dryly mixed and pulverized to obtain a raw material mixture.

TABLE 6

| | Chemical composition of melt [mol %] | | | | $ZrO_2/$ $(ZrO_2 + CeO_2)$ [mol %] | $(ZrO_2 + CeO_2)/$ $(ZrO_2 + CeO_2 + RO + B_2O_3)$ [mol %] | $RO/$ $(RO + B_2O_3)$ [mol %] |
|---|---|---|---|---|---|---|---|
| | $ZrO_2$ | $CeO_2$ | RO | $B_2O_3$ | | | |
| Ex. 97 | 4.0 | 6.0 | 56.3MgO | 33.8 | 40.0 | 10.0 | 62.5 |
| Ex. 98 | 6.0 | 9.0 | 53.1MgO | 31.9 | 40.0 | 15.0 | 62.5 |
| Ex. 99 | 6.0 | 9.0 | 47.2MgO | 37.8 | 40.0 | 15.0 | 55.6 |

TABLE 6-continued

| | Chemical composition of melt [mol %] | | | | ZrO$_2$/ (ZrO$_2$ + CeO$_2$) [mol %] | (ZrO$_2$ + CeO$_2$)/ (ZrO$_2$ + CeO$_2$ + RO + B$_2$O$_3$) [mol %] | RO/ (RO + B$_2$O$_3$) [mol %] |
|---|---|---|---|---|---|---|---|
| | ZrO$_2$ | CeO$_2$ | RO | B$_2$O$_3$ | | | |
| Ex. 100 | 8.0 | 12.0 | 44.4MgO | 35.6 | 40.0 | 20.0 | 55.6 |
| Ex. 101 | 10.0 | 15.0 | 41.7MgO | 33.3 | 40.0 | 25.0 | 55.6 |
| Ex. 102 | 6.0 | 9.0 | 42.5MgO | 42.5 | 40.0 | 15.0 | 50.0 |
| Ex. 103 | 8.0 | 12.0 | 40.0MgO | 40.0 | 40.0 | 20.0 | 50.0 |
| Ex. 104 | 10.0 | 15.0 | 37.5MgO | 37.5 | 40.0 | 25.0 | 50.0 |
| Ex. 105 | 6.0 | 9.0 | 37.8MgO | 47.2 | 40.0 | 15.0 | 44.4 |
| Ex. 106 | 8.0 | 12.0 | 35.6MgO | 44.4 | 40.0 | 20.0 | 44.5 |
| Ex. 107 | 10.0 | 15.0 | 33.3MgO | 41.7 | 40.0 | 25.0 | 44.4 |
| Ex. 108 | 6.0 | 9.0 | 34.0MgO | 51.0 | 40.0 | 15.0 | 40.0 |
| Ex. 109 | 8.0 | 12.0 | 32.0MgO | 48.0 | 40.0 | 20.0 | 40.0 |
| Ex. 110 | 10.0 | 15.0 | 30.0MgO | 45.0 | 40.0 | 25.0 | 40.0 |
| Ex. 111 | 12.0 | 18.0 | 28.0MgO | 42.0 | 40.0 | 30.0 | 40.0 |
| Ex. 112 | 10.0 | 15.0 | 25.0MgO | 50.0 | 40.0 | 25.0 | 33.3 |
| Ex. 113 | 12.0 | 18.0 | 23.3MgO | 46.7 | 40.0 | 30.0 | 33.3 |
| Ex. 114 | 10.0 | 15.0 | 15.0MgO | 60.0 | 40.0 | 25.0 | 20.0 |
| Ex. 115 | 12.0 | 18.0 | 14.0MgO | 56.0 | 40.0 | 30.0 | 20.0 |

The raw material mixture thus obtained was subjected to the mixing and pulverizing operation, melting operation, quenching operation, crystallizing operation and leaching operation in the same manner as in Examples 1 to 96 to obtain crystalline fine particles having a particle size of from 5 to 200 nm.

The mineral phase of the obtained fine particles was identified by means of an X-ray diffractometer. As a result, all the diffraction peaks of the fine particles of Examples 97 to 115 approximately agreed with at least one diffraction peak of existing cubic ZrO$_2$ (PDF#49-1642), cubic CeO$_2$ (PDF#34-0394), a solid solution of cubic ZrO$_2$ and cubic CeO$_2$, tetragonal ZrO$_2$ (PDF#72-1669) and Zr$_{0.5}$Ce$_{0.5}$O$_2$ (PDF#38-1436).

Example 116

Comparative Example

Zirconium oxide (ZrO$_2$), cerium oxide (CeO$_2$), barium carbonate (BaCO$_3$) and boron oxide (B$_2$O$_3$) were respectively weighed so that a melt had a composition of 1.0%, 1.0%, 38.0% and 60.0%, as represented by mol % based on ZrO$_2$, CeO$_2$, BaO and B$_2$O$_3$, respectively, to obtain a raw material mixture.

The raw material mixture thus obtained, was subjected to the mixing and pulverizing operation, melting operation, quenching operation, crystallizing operation and leaching operation in the same manner as in Examples 1 to 115, and as a result, it was impossible to visually confirm crystalline ceria-zirconia solid solution crystal fine particles.

Example 117

Comparative Example

Zirconium oxide (ZrO$_2$), cerium oxide (CeO$_2$), barium carbonate (BaCO$_3$) and boron oxide (B$_2$O$_3$) were respectively weighed so that a melt had a composition of 30.0%, 30.0%, 10.0% and 30.0%, as represented by mol % based on ZrO$_2$, CeO$_2$, BaO and B$_2$O$_3$, respectively, to obtain a raw material mixture.

The raw material mixture, thus obtained was subjected to the mixing and pulverizing operation in the same manner as in Examples 1 to 115, followed by melting operation, but the mixture was not completely melted, so as to obtain no amorphous material.

Examples 118 and 119

Comparative Examples

A melt obtained by dryly pulverizing a raw material mixture having the same composition as in each of Examples 8 and 14 and melting it in the same manner as in Examples 1 to 115, was cooled in an electronic furnace to room temperature at a rate of 300° C./hr, whereupon an opaque solid was formed and no amorphous material was obtained.

Example 120

Comparative Example

A raw material mixture having the same composition as in Example 8 was subjected to the mixing and pulverizing operation, melting operation and quenching operation in the same manner as in Examples 1 to 16, and then heated at 500° C. for 8 hours to carry out the crystallizing operation. Then, the leaching operation was carried out in the same manner as in Examples 1 to 115, and as a result, it was impossible to visually confirm crystalline ceria-zirconia solid solution crystal fine particles were visually confirmed.

Industrial Applicability

According to the present invention, it is possible to obtain crystalline ceria-zirconia solid solution crystal fine particles having a small particle size and excellent uniformity in particle size, and having cerium and zirconium solid-solved in the desired composition. Further, since such fine particles have a high specific surface area, excellent heat resistance, and undergo insignificant change in the particle size even in high-temperature use, they are suitably used, over a long period of time, as an oxidation-reduction catalyst, a co-catalyst of a three-way catalyst for treatment of exhaust gas discharged from automobiles, a material for fuel cells, and so on.

What is claimed is:

1. A process for producing ceria-zirconia solid solution crystal fine particles, comprising (1) obtaining a melt containing, as represented by mol % based on oxides, from 5 to 50% of (ZrO$_2$+CeO$_2$), from 10 to 60% of RO (wherein R is at least one member selected from the group consisting of Mg, Ca, Sr and Ba) and from 25 to 70% of $B_2O_3$ by heating at a temperature of from 1200 to 1600° C., (2) quenching the melt to obtain an amorphous material, (3) heating the amorphous material at a temperature of from 550 to 1000° C. to precipitate ceria-zirconia solid solution crystals in the amorphous material, and (4) separating components other than the ceria-zirconia solid solution crystals from the obtained precipitates to obtain the ceria-zirconia solid solution crystal fine particles, in this order.

2. The process for producing ceria-zirconia solid solution crystal fine particles according to claim 1, wherein in the chemical composition of the melt, $ZrO_2/(ZrO_2+CeO_2)=3$ to 97%, as represented by mol % based on oxides.

3. The process for producing ceria-zirconia solid solution crystal fine particles according to claim 1, wherein in the chemical composition of the melt, $RO/(RO+B_2O_3)=10$ to 70%, as represented by mol % based on oxides.

4. The process for producing ceria-zirconia solid solution crystal fine particles according to claim 1, wherein in the chemical composition of the melt, Ca is contained as R.

5. The process for producing ceria-zirconia solid solution crystal fine particles according to claim 1, wherein in the chemical composition of the melt, R is Ca.

6. The process for producing ceria-zirconia solid solution crystal fine particles according to claim 1, wherein the amorphous material is of a flake form or a fiber form.

7. The process for producing ceria-zirconia solid solution crystal fine particles according to claim 1, wherein (4) is carried out by using an acid.

8. The process for producing ceria-zirconia solid solution crystal fine particles according to claim 1, wherein the ceria-zirconia solid solution crystals have a cubic crystal structure.

9. The process for producing ceria-zirconia solid solution crystal fine particles according to claim 1, wherein in the chemical composition of the ceria-zirconia solid solution crystal fine particles, $ZrO_2/(ZrO_2+CeO_2)=1$ to 99%, as represented by mol % based on oxides.

10. The process for producing ceria-zirconia solid solution crystal fine particles according to claim 1, wherein in the chemical composition of the ceria-zirconia solid solution crystal fine particles, $RO/(CeO_2+ZrO_2+RO+B_2O_3)=0.01$ to 20%, as represented by mol % based on oxides.

11. The process for producing ceria-zirconia solid solution crystal fine particles according to claim 1, wherein the ceria-zirconia solid solution crystal fine particles have an average primary particle size of from 5 to 200 nm.

12. The process for producing ceria-zirconia solid solution crystal fine particles according to claim 1, wherein the ceria-zirconia solid solution crystal fine particles have a specific surface area of at least 20 $m^2/g$.

\* \* \* \* \*